Feb. 19, 1963 F. G. WILLEY 3,078,340

MEANS FOR INFRARED IMAGING IN COLOR

Filed Nov. 9, 1954

INVENTOR
FRANK G. WILLEY
BY Mitchell & Bechert
ATTORNEYS

United States Patent Office 3,078,340
Patented Feb. 19, 1963

3,078,340
MEANS FOR INFRARED IMAGING IN COLOR

Frank G. Willey, East Hills, Roslyn Heights, N.Y., assignor to Servo Corporation of America, New Hyde Park, N.Y., a corporation of New York Filed Nov. 9, 1954, Ser. No. 467,710
14 Claims. (Cl. 178—6.7)

My invention relates to optical scanning and display devices of the general character disclosed in copending patent application, Serial No. 320,272, filed November 13, 1952, in the name of Henry Blackstone, et al., now patent No. 2,967,211.

In scanning devices of the character indicated, the latitude or dynamic range of video-signal amplitudes developed in the course of scanning substantially exceeds the reproduction capability of conventional display equipment. For this reason, such displays may be viewed as unnecessarily limiting the available intelligence, and this is particularly true for the case in which cathode-ray tubes are employed for display purposes.

It is, accordingly, an object of the invention to provide improved display means in conjunction with a scanner of the character indicated.

It is another object to provide an improved display means wherein a substantially greater dynamic range will inherently characterize the display.

It is a further object to provide improved display means utilizing a greater proportion of available intelligence in the scanning video signal than has heretofore been possible.

It is a specific object to apply multiple-color display techniques to an essentially gray input video signal, with a view to improving interpretability.

It is a general object to meet the above objects with apparatus requiring relatively little additional complexity over conventional equipment, and yet affording less chance that the operator will improperly adjust the equipment when seeking a display of maximum interpretability.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, my invention contemplates a scanner including an energy-responsive element and an optical system with means for periodically causing the image of said element to traverse a scan line or frame in the field of view. The video output of the energy-responsive means is subjected to quantizing techniques, whereby ranges of video-signal level are segregated into separate channels, and these separate channels are caused to activate separate display means. For the preferred arrangements which are shown and discussed herein, the separate displays are in separate colors, so that, for example, red intensity-modulations in the display may represent video signals of greatest amplitude, and blue intensity-modulations in the display may represent video signals of lesser amplitude. Various special arrangements are described for adaptation of the scanner and display means to aircraft reconnaissance and navigation.

Figures 1, 2:
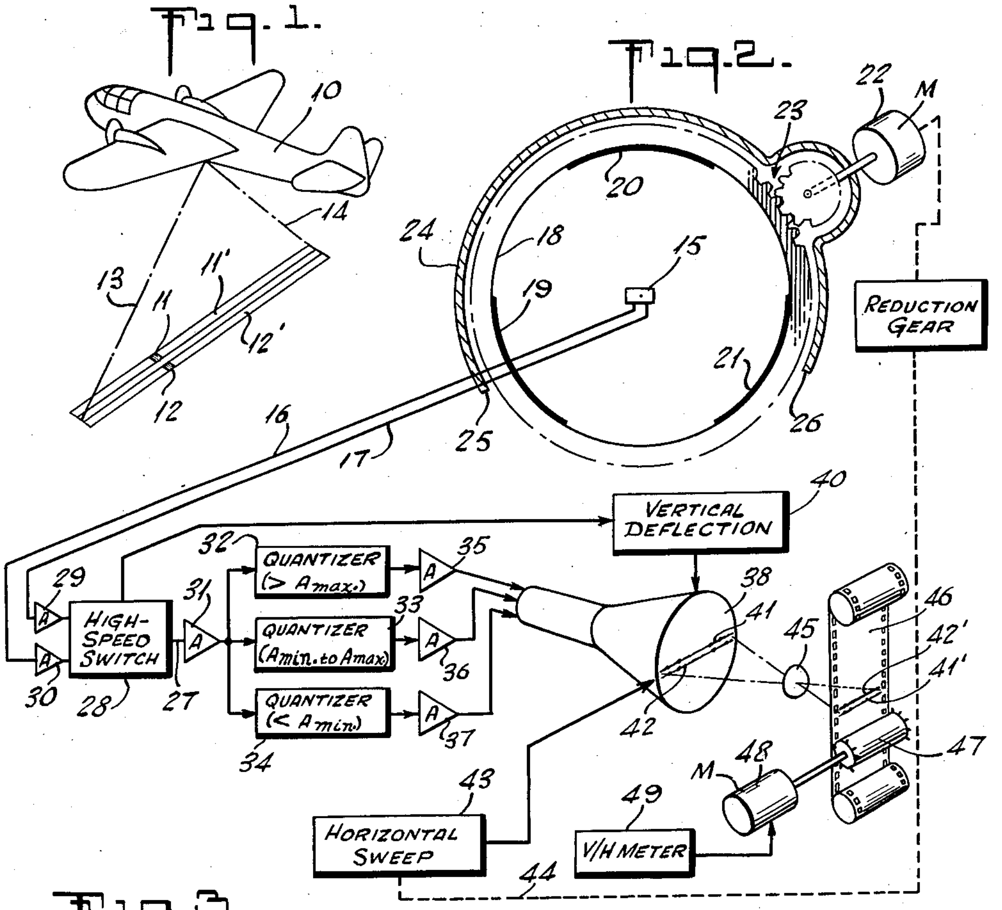
FIG. 1 is a simplified view in perspective, illustrating an aircraft and the general optical capabilities of airborne scanning equipment of the invention.
FIG. 2 is a diagram illustrating optical, mechanical, and electrical components of a scanner and display means of the invention and of a type contemplated in FIG. 1.

Referring to FIG. 1 of the drawings, my invention is shown in application to a scanner as may be carried by a reconnaissance or the like aircraft 10 and having moving optical elements for periodically causing the image or images 11—12 of energy-responsive means to traverse one or more scan lines 11′—12′ beneath the aircraft, as between the lateral limits 13—14. Traversal of more than one line per scan will be understood as suggestive of frame-sequential scanning action, even though the language herein may refer to several spaced elements scanning a line.

The scanner may be one of various types, but for simplicity of description in the present connection, I have chosen to illustrate the invention as applied to a scanner of the type described in the above-identified copending patent application. Such a scanner may include energy-responsive means, such as a cell 15, having one or more energy-responsive elements and, since in the form shown two elements are used to develop the ground images 11—12, two separate video outputs 16—17 are available from the cell 15. The cell 15 may be at the center of rotation of a scanner drum 18, on which are mounted a plurality of like optical elements 19—20—21, which may be mirrors of equal angular width and spaced from each other by amounts equal to their width. The scanner 18 may be continuously driven, as by a motor 22, having an edge-drive connection 23 to the drum 18. To avoid spurious responses, shielding means 24 are shown to embrace the entire scanner structure, except for a window or opening between limits 25—26; shield 24 assures that incoming energy may pass to only one of the mirrors 19—20—21 at a time, for focusing on the cell 15.

In accordance with the invention, I provide quantizing means for segregating a plurality of different ranges of video-signal level into separate quantizer output channels. If there were but one energy-responsive element having but a single video output, as in line 16, such quantizing means would be directly connected thereto; however, in the form shown, the cell 15 comprises a line array of separate energy-responsive elements, said elements being aligned along the axis of rotation of the scanner drum 18 and oriented generally with the flight axis. To derive a single video signal, as in the line 27, I provide a high-speed switch 28 connected directly to the lines 16—17, or by way of amplifiers 29—30, so that these lines may be alternately commutated or sampled. Further amplifier means 31 may process the resulting single commutated video signal for handling by the quantizing means, and in the form shown I schematically indicate three separate quantizers 32—33—34 for performing the desired function. The legend on the quantizer 33 suggests adjustment to segregate signals of intermediate-amplitude range, ranging from minimum to maximum limits designated "$A_{min}$ to $A_{max}$." The quantizer 32 is similarly adjusted to segregate signal amplitudes greater than $A_{max}$, while the quantizer 34 is adjusted to segregate signal amplitudes less than $A_{min}$.

If desired, further amplifiers 35—36—37 may process the segregated video signals for transmission to the display means. In the form shown, the display means is a single cathode-ray tube 38 of the three-color variety and therefore having separate input intensity-modulation controls for each of the three color-components of the display. For the case in which the three colors are red, green, and blue, I prefer to connect the signals representing input video of greatest amplitude (from amplifier 35) to the red color-control connection of tube 38, while the signals representing input video of intermediate level (from amplifier 36) are connected to the green-control connection, and signals representing input video of lowest level (from amplifier 37) are connected to the blue-control connection. The display is completed by supplying appropriate deflection voltages. Thus, vertical deflection voltage may be available from means 40 and responsive to operation of the switch 28, so as to appropriately segregate display lines 41—42 representing the scan lines 11'—12' on the ground. The horizontal-deflection voltages may be available from a sweep circuit 43 synchronized with scan action, as suggested by the dashed connection 44.

To integrate the intelligence inherent in repeated display of the lines 41—42 for successive scan actions, I show continuously moving photographic recording means comprising optics 45 imaging the displayed lines (41—42) at 41'—42' on a strip of film or otherwise suitably sensitive material 46. Film-advancing means 47 may be continuously driven by a motor 48, and for the case of aerial reconnaissance it is convenient to employ a *V/H* meter 49 to control the speed of the motor 48. A *V/H* meter will yield a control signal representing the velocity-altitude function of the aircraft, and a suitable meter is disclosed in greater detail in copending application, Serial No. 444,990, filed July 22, 1954, in the name of Henry Blackstone, now Patent No. 2,878,711.

The scanner and display of FIG. 2 will be seen to develop on the film 46 a succession of recorded double-line displays, spaced in accordance with the movement of the film 46 during and between successive scans. If the energy-responsive elements happen to be thermally responsive, the hottest scanned objects will in general appear on the film as red elements of the display, and the coolest elements will in general be blue; but it will be understood that other types of color emphasis may be obtained by suitable adjustment of the various quantizers and the amplitude ranges segregated thereby.

Figure 3:
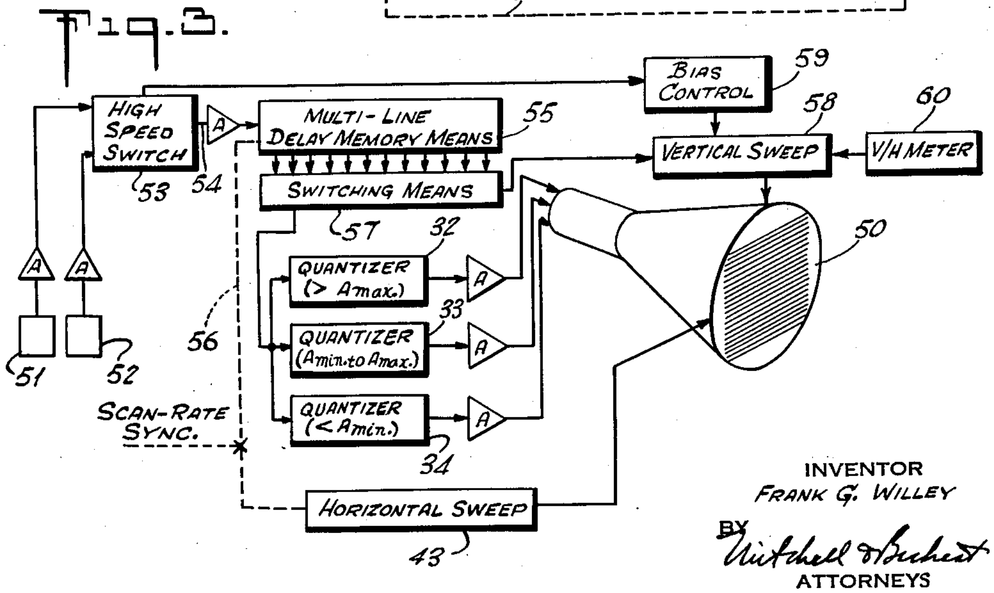
FIG. 3 is a diagram similar to FIG. 2 but illustrating alternative components to create a different display.

In FIG. 3, I show a slightly different display at the cathode-ray tube 50, whereby a full frame of intelligence may be effectively continuously displayed in a plurality of colors, even though the number of lines in the ultimate display substantially exceeds the number of lines derived upon each scan action. The basic video intelligence may be available from energy-responsive elements 51—52 of a line array of elements, as discussed in connection with FIGS. 1 and 2, and a high-speed switch 53 corresponding to the switch 28 of FIG. 2 may commutate the separate video outputs into the single line 54. In order to provide multiplication of the number of lines instantaneously displayed at 50, I feed the commutated video signal into a multiple-line delay memory device 55, as of the type disclosed in greater detail in Blackstone application Serial No. 394,346, filed November 25, 1953.

The memory device 55 may comprise an endless continuously recycling magnetic tape or other storage means synchronized as suggested by the dashed-line connection 56 with the basic scan rate of the optical system (not shown in FIG. 3, but as of the type shown at 18 in FIG. 2). The memory means 55 may include a plurality of pick-offs or at least means for yielding multiple separate outputs, said outputs being effectively spaced along the tape by an amount equivalent to one scan line, so that, when successively sampled by high-speed switching means 57, not only is video intelligence being sampled for the latest available scan line, but also for the most recent *n* scan lines, where "*n*" is the number of outputs of the means 55. The switching means 57 will yield a single commutated video output, and quantizing means 32—33—34, as previously described, may segregate into separate channels video signals reflecting the different amplitude ranges developed by the cell elements 51—52. The horizontal deflection may be governed by the sweep circuit 43, as previously described, but of course vertical deflection will require a step-function generator or sweep circuit 58 responsive not only to the action of switching means 57 but also to the action of switch 53, which is shown impressing a bias control 59 on the action of the vertical sweep circuit 58. To preserve proper vertical and horizontal scale in the display on tube 50, I show a *V/H* meter connection 60 to the vertical sweep circuit, all as described in greater detail in said Blackstone application Serial No. 394,346.

It will be seen that I have described a relatively simple mechanism whereby substantially improved displays may be created for the full dynamic range of intelligence, or for a substantially greater fraction of the dynamic range of intelligence inherent in the video output of energy-responsive means of the character indicated. My mechanism involves little additional complexity over previous arrangements, and demands for adjustment by the operator are reduced to a minimum.

While I have described the invention in detail for the preferred forms shown, it will be understood that modifications may be made within the scope of the invention as defined in the claims which follow.

I claim:

1. Optical scanning and display means, comprising a relatively fixed energy-responsive element, continuously movable scanner means including an optical element causing the image of said energy-responsive means to scan a line in the field of view, whereby a video output may be developed by said energy-responsive element, first, second, and third quantizing means responsive to said video output and segregating said output into three channels respectively representing three ranges of amplitudes within the full dynamic range of said video output, and separate display means separately responsive to the respective outputs of said first, second, and third quantizing means.

2. Optical scanning and display means, comprising a relatively fixed energy-responsive element, continuously movable scanner means including an optical element causing the image of said energy-responsive means to scan a line in the field of view, first, second, and third quantizing means responsive to the video output of said energy-responsive means and segregating said output into three channels respectively representing three ranges of amplitudes within the full dynamic range of said video output, and three-color video-display means with separate color control-connections to the respective outputs of said first, second, and third quantizing means.

3. A device according to claim 2, in which said last-defined means is a three-color cathode-ray tube.

4. An aerial-reconnaissance device adapted for mounting in an aircraft, comprising a relatively fixed energy-responsive element, optics including a movable element for imaging said energy-responsive element beneath the aircraft and for causing said image periodically to traverse the flight axis, quantizing means responsive to the video output of said energy-responsive element and segregating signals of a first range of amplitudes into a first channel and signals of a second range of amplitudes into a second channel, and a single multiple-color display means having a first color response to one of said quantized outputs and a second color response to the other of said quantized outputs.

5. The combination of claim 4, and including recording-camera means including a strip of color-sensitized film or the like, optics for imaging said display transversely of said film, and means for continuously advancing said film.

6. The combination of claim 5, in which said last-defined said film-advancing means includes *V/H*-responsive means in speed-controlling relation therewith.

7. An aerial-reconnaissance device adapted for mount-in an aircraft, comprising a line array of separate energy-responsive elements, scanner optics including a movable element and imaging said line array beneath the aircraft in an orientation generally parallel with the flight axis and causing the image of said array to traverse the vertical plane including the flight axis, switching means successively sampling the video outputs of said elements and providing a single commutated video output, quantizing means responsive to said video output and including means for segregating into a first output channel signals representative of a first range of video levels and into a second output channel signals representative of a second range of video levels, multi-color display means having a first color-control connection to one of the quantized channel outputs and a second color-control connection to the second of said quantized signal outputs, first deflection means for said display means and responsive to operations of said switch for segregating deflection voltages in accordance with the energy-responsive element instantaneously sampled by said switch, and second deflection means for said display means and functioning in a sense transverse to that of said first deflection means and synchronized with movement of said optical element.

8. A device according to claim 7, in which said display means is a three-color cathode-ray tube and in which said quantizing means includes means for segregating video levels into a third range of video levels and connected to the third color-control connection of said cathode-ray tube.

9. The device according to claim 7, in which said scanner optics includes a plurality of like optical elements mounted in equally spaced relation on a support rotatable about said line array and continuously focused on said line array.

10. In combination, a thermally-responsive cell, scanner optics including a movable element focusing thermal energy on said cell, whereby said cell may yield a video output reflecting thermal intensity in the field of view, three-color display means including separate intensity-modulation controls for each of three colors; and quantizing means responsive to the video output of said cell and segregating upper, intermediate, and lower amplitude ranges of said video output into three separate channels separately connected to the respective intensity-modulated controls of said display means.

11. A device according to claim 10, in which the colors of said display means include the color "red," and in which the quantized signals representing maximum video amplitude are in intensity-modulating relation with said red color control.

12. A device according to claim 10, in which the colors of said display means include the color "blue" and in which the quantized signals representing minimum video amplitude are in intensity-modulating relation with said blue color control.

13. In combination, a scanner including energy-responsive means and means for causing an image thereof periodically to scan a line in a field of view, multi-line delay memory means synchronized with the periodicity of scan and responsive to input video signals to store a plurality of successive lines of video intelligence and to yield separate outputs at scan-line spacing, switching means commutating said separate outputs into a single video signal, quantizing means responsive to said single video channel to segregate signals of a first range of levels into a first channel and signals of a second range of levels into a second channel, multi-color cathode-ray display means having a first color-control connection to one of said channels and a second color-control connection to the other of said channels, vertical-deflection means for said cathode-ray tube and responsive to the action of said switching means for segregating on the vertical axis the various video signals according to the instantaneously commutated channel, and horizontal-deflection means for said display tube and synchronized with the scan rate of said scanner.

14. The combination according to claim 13, in which said energy-responsive means include a line array of energy-responsive elements, said scanner including means imaging said array in the field of view generally transverse to scan action, further switching means commutating the outputs of said elements into a single video channel connected to said memory means, and a control connection from said further switching means to said vertical-deflection means.

References Cited in the file of this patent

UNITED STATES PATENTS 2,593,925 Sheldon ---------------- Apr. 22, 1952